United States Patent
Park

(10) Patent No.: US 6,246,814 B1
(45) Date of Patent: Jun. 12, 2001

(54) TUNABLE CHIRPED FIBER GRATING DEVICE AND METHOD FOR FORMING CHIRPED FIBER GRATING

(75) Inventor: Moo-youn Park, Kwangmyung (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/224,059

(22) Filed: Dec. 31, 1998

(30) Foreign Application Priority Data

Dec. 31, 1997 (KR) .................................. 97-82102

(51) Int. Cl.$^7$ ........................................ G02B 6/34
(52) U.S. Cl. ................ 385/37; 385/10; 385/39; 65/385; 65/392; 359/290
(58) Field of Search ................ 385/37, 10, 12, 385/39; 372/6, 102; 359/290; 65/35, 111, 385, 392

(56) References Cited

U.S. PATENT DOCUMENTS

| | | |
|---|---|---|
| 3,942,048 | 3/1976 | Laude et al. . |
| 5,007,705 | 4/1991 | Morey et al. . |
| 5,636,304 | 6/1997 | Mizrahi et al. . |
| 5,671,307 | 9/1997 | Lauzon et al. . |
| 5,694,501 | 12/1997 | Alavie et al. . |
| 5,699,468 | 12/1997 | Farries et al. . |
| 5,718,738 | 2/1998 | Kohnke et al. . |
| 5,781,670 | 7/1998 | Deacon et al. . |
| 5,982,963 * | 11/1999 | Feng et al. ........................ 385/37 |

FOREIGN PATENT DOCUMENTS

| | | |
|---|---|---|
| 2134958 | 5/1996 | (CA) . |
| 0695957 | 2/1996 | (EP) . |
| 2 286 898 | 8/1995 | (GB) . |
| 2 295 689 | 5/1996 | (GB) . |
| 2309317 | 7/1997 | (GB) . |
| WO 95/30926 | 11/1995 | (WO) . |
| WO 96/26458 | 8/1996 | (WO) . |

OTHER PUBLICATIONS

Ohn M M, et al.: "Dispersion Variable Fibre Bragg Grating Using a Piezoelectric Stack" Electronics Letters, Oct. 10, 1996, IEE, UK, vol. 32, No. 21, pp. 2000–20001, XP 000683539 ISSN 0013–5194.

Cruz J. L , et al.: "Fibre Bragg Gratings Tuned Nad Chirped Using Magnetic Fields" Electronics Letters, Jan. 30, 1997, IEE, UK, vol. 33, No. 3, pp. 235–236, XP00725938 ISSN 0013–5194.

Pacheco M, et al. "Chirping Optical Fibre Bragg Gratings Using Taperd–thicknes Piezoelectric Ceramic" Electronics Letters, Nov. 26, 1998, IEE, UK, vol. 34, No. 24, pp. 2348–2350, XP 002099851 ISSN 0013–5194.

* cited by examiner

Primary Examiner—James Derrington
(74) Attorney, Agent, or Firm—Robert E. Bushnell, Esq.

(57) ABSTRACT

A tunable chirped grating device for an optical fiber, wherein the grating has equal spacings between index perturbations. A piezoelectric element is bonded to the optical fiber for changing the perturbation spacings according to an applied voltage, and a voltage source applys the voltage to the piezoelectric element. Since a predetermined piezoelectric element is bonded to an optical fiber provided with a grating having regular spacings and the perturbation spacings can be differently deformed by applying different electric field to respective perturbation positions by the piezoelectric element, then the resulting in a chirped grating device, whose manufacturing procedure is simple and which has flexibility, can provide adjustable chirping rates of the reflected wavelengths waves.

15 Claims, 1 Drawing Sheet

TUNABLE CHIRPED FIBER GRATING DEVICE AND METHOD FOR FORMING CHIRPED FIBER GRATING

CLAIM OF PRIORITY

This application makes reference to, incorporates the same herein, and claims all benefits accruing under 35 U.S.C §119 from an application entitled Tunable Chirped Fiber Grating Device And Method For Forming Chirped Fiber Grating earlier filed in the Korean Industrial Property Office on Dec. 31, 1997, and there duly assigned Serial No. 97-82102 by that Office.

BACKGROUND OF THE INVENTION

1. Field of the Invention

The present invention relates to a tunable chirped fiber grating device in which the spacings of perturbations in the index of refraction vary with a strain which is produced by applying a voltage across a predetermined piezoelectric element and a method for forming a chirped fiber grating.

2. Description of the Related Art

Typically, a chirped grating is designed to have different perturbation spacings or different effective refractive indices depending on positions of the perturbations, and is characterized in that the wavelength of reflected light differs depending on the positions of the perturbations. FIGS. 1A and 1B show side views illustrating an optical fiber in which a chirped grating is formed. Here, a core is represented by reference numeral 100 or 120, a cladding by 110 or 130, and a grating by 101 or 102. The chirped grating 101 in the core 100 according to FIG. 1A has a structure in which the spacings of successive perturbations are different from each other, while the effective refractive indices of the perturbations are the same, and a chirped grating 102 in the core 120 according to FIG. 1B has a structure in which the spacings of successive perturbations are the same, while the effective refractive indices of the perturbations are different from each other.

However, chirped gratings in which the spacings of successive perturbations are different are doomed to experience more complicated procedures than those having equal perturbation spacings. Since the chirping rates of the reflected wavelengths according to the positions of the perturbations are fixed to values in fabrication conditions and the gratings are used for a specific wavelength band, the gratings cannot be flexibly applied (manufactured).

Forming chirped gratings is known in the art as exemplified by U.S. Pat. No. 5,781,670 to is David A. G. Deacon, et al. entitled Optical Frequency Channel Selection Filter With Electronically-controlled Grating Structures; U.S. Pat. No. 5,718,738 to Glenn Eric Kohnke et al. entitled Method For Making Continuously Chirped Fiber Bragg Gratings; U.S. Patent No. 5,636,304 to Victor Mizrahi et al. entitled Article Comprising A Spa tially Varying Bragg Grating In An Optical Fiber; and U.S. Pat. No. 5,007,705 to William W. Morey et al. entitled Variable Optical Fiber Bragg Filter Arrangement.

SUMMARY OF THE INVENTION

To solve the above problem, it is an objective of the present invention to provide, in an optical fiber, a tunable chirped grating device whose perturbation spacings are equal but will differ from each other by applying a controlled voltage to an element attached to the optical fiber since the length of the attached element can vary with the applied voltage, and a method for forming a chirped fiber grating.

Accordingly, to achieve the above objective, there is provided a tunable chirped grating device, included in an optical fiber, having the same spacings between index perturbations, a piezoelectric element, bonded to the optical fiber, for changing the perturbation spacings according to an applied voltage, and a voltage source for applying the voltage to the piezoelectric element.

To achieve the above objective, there is provided a method for forming a chirped fiber grating including the steps of (a) forming a grating having regularly spaced perturbations in the optical fiber, and (b) causing the perturbation spacings of the optical fiber grating to differ from each other by applying different tensions to the optical fiber grating according to the positions of the perturbations.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1A:
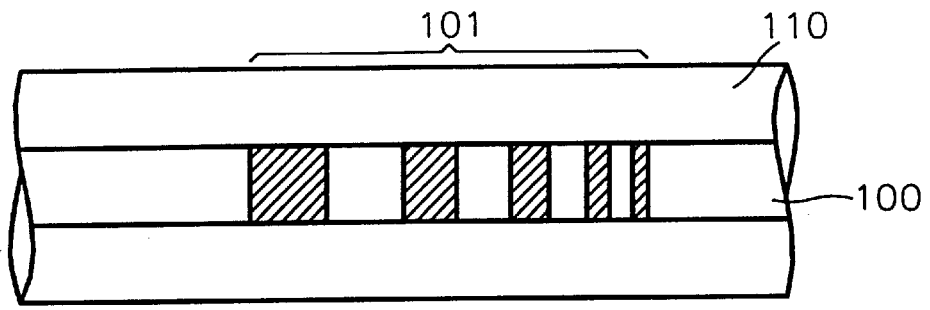
FIGS. 1A and 1B are side views illustrating an optical chirped grating is formed.
Figure 1B:
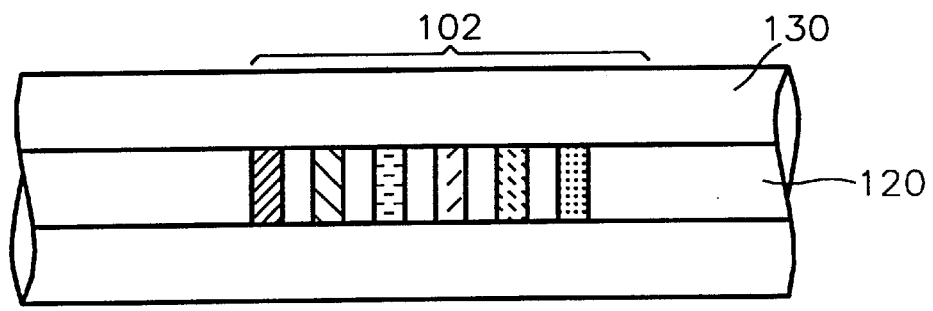
Figure 2:
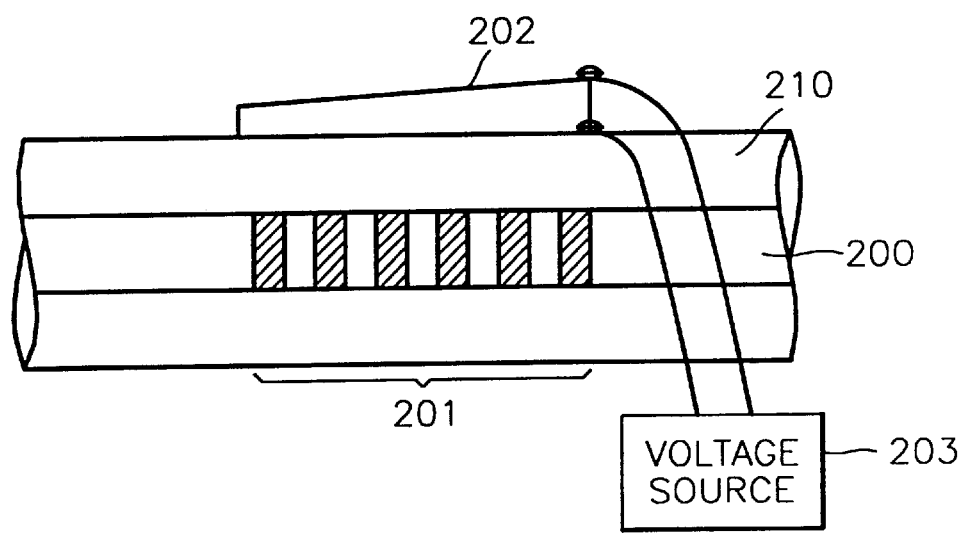
FIG. 2 is a side view illustrating the structure of a tunable chirped grating device according to the present invention.

FIG. 2 shows a side view illustrating the structure of a tunable chirped grating device according to the present invention. The tunable chirped grating device shown in FIG. 2 includes an optical fiber in which a grating 201 having equally spaced perturbations which have the same refractive index perturbations in a core 200 formed inside a cladding 210, a piezoelectric element 202 attached to the optical fiber, and a voltage source 203 for supplying a voltage to the piezoelectric element 202.

A method for forming a chirped grating using the above described structure is as follows. That is, the grating 201 having regularly spaced perturbations is formed in the optical fiber core 200, and the spacings of perturbations are caused to differ from each other by applying different tensions to the optical fiber grating 201 according to the positions of the perturbations. The tensions are created by the piezoelectric element 202 and the voltage source 203.

The grating 201 satisfies the following Bragg condition in the optical fiber core 200.

$$\lambda_i = 2 \cdot n_{eff} \cdot d_i$$

where $\lambda_i$ is the wavelength of an incident wave, $n_{eff}$ is the effective index of refraction, and $d_i$ is the spacing between perturbations.

The material of the piezoelectric element 202 attached on the outside of the grating 201 is a material which can be deformed according to the voltage applied by the voltage source 203, and $Pb(Zr_xTi_{1-x})O_3$, $0.4 \leq x \leq 0.6$ (PZT or Lead Zirconate Titanate) is preferably appropriate for the material. Epoxy may be used as the adhesive. The piezoelectric element 202 made of a material such as PZT deforms in a direction perpendicular to the applied electrical field. The shape of the piezoelectric element 202 is preferably wedge-shaped in order for deformations at each position to occur with different degrees from each other according to the applied voltage. That is, though the applied voltage is constant, as a portion of the piezoelectric element 202 is thicker than another portion, the electrical field becomes relatively weaker than the thinner portion. As a result, the thinner portion deforms to a smaller extent than the thicker portion.

The perturbation spacings of the grating 201 bonded to the piezoelectric element 202 having the above-described characteristics, vary with the deformation of the piezoelectric element 202. Consequently, a chirped grating device having different spacings between perturbations can be formed. Further, when the voltage applied by the voltage source 203 is adjusted, the chirping rates of the reflected wavelengths can be adjusted.

According to the present invention, since a predetermined piezoelectric element is bonded to an optical fiber provided with a grating having regular perturbation spacings and the perturbation spacings can be differently deformed by applying different electrical fields to respective perturbation positions by the piezoelectric element, and the chirping rates of the reflected wavelengths can be adjusted, a chirped grating device whose manufacturing procedure is simple and which has flexibility can be provided.

what is claimed is:

1. A tunable chirped grating device comprising:
   an optical fiber having equal spacings between index perturbations of a chirped grating;
   an elongated piezoelectric element having one end with a thickness greater than an opposite end in the longitudinal direction, bonded to the optical fiber, for varying the spacings between the perturbations in response to an applied voltage; and
   a voltage source for applying the voltage to the piezoelectric element.

2. The tunable chirped grating device as claimed in claim 1, wherein the material of the piezoelectric element is $Pb(Zr_xTi_{1-x})O_3$.

3. The tunable chirped grating device as claimed in claim 1, wherein the piezoelectric element is wedge-shaped and is bonded to the optical fiber using an epoxy.

4. A method for forming a chirped grating including the steps of:
   forming a grating having regularly spaced perturbations in a core of an optical fiber;
   bonding a wedge-shaped piezoelectric device to said optical fiber adjacent said grating; and
   stretching said optical fiber by applying a controlled voltage to said wedge-shaped piezoelectric device in order to vary the spacings between the perturbations.

5. The method as claimed in claim 4, wherein said step of stretching applies different tensions to said optical fiber according to a variation in thickness of said wedge shaped piezoelectric device.

6. A method for forming a chirped grating, said method comprising the steps of:
   forming a Bragg grating having equal spacing between perturbations in a core of an optical fiber;
   bonding a wedge-shaped piezoelectric device to said optical fiber adjacent said Bragg grating; and
   applying tension to said optical fiber by applying a controlled voltage to said wedge-shaped piezoelectric device.

7. A tunable chirped fiber grating device, comprising:
   an optical fiber having a core and a cladding;
   a grating formed in the core of the optical fiber, said grating comprising equally spaced perturbations in the refractive index of the core, each of said perturbations being equal to the other perturbations in magnitude;
   a piezoelectric element attached to the optical fiber adjacent to the grating, said piezoelectric element being thicker at a first portion than at a second portion of the piezoelectric element which is adjacent to a different axial location on the optical fiber than the first portion; and
   electrical connections connected to said piezoelectric element so as to provide an electric field approximately perpendicular to the axis of the optical fiber, for causing the piezoelectric element to deform in a direction perpendicular to the applied electric field.

8. The device of claim 7, further comprising:
   said first portion of the piezoelectric element being thicker than said second portion measured along a direction perpendicular to the axis of the optical fiber.

9. The device of claim 7, further comprising:
   the thickness of said piezoelectric element between said first portion and second portion varying linearly with distance along the axis of the optical fiber.

10. The device of claim 8, further comprising:
    the thickness of said piezoelectric element between said first portion and second portion varying linearly with distance along the axis of the optical fiber.

11. The device of claim 7, further comprising:
    said piezoelectric element being wedge-shaped.

12. The device of claim 7, said electrical connections being attached to said first portion of the piezoelectric element, for providing the electric field at the thicker portion of the element.

13. The device of claim 7, said piezoelectric element being made of a lead zirconate titanate composition.

14. The device of claim 7, said piezoelectric element being attached to the optical fiber by an adhesive.

15. A method for forming a chirped grating, comprising the steps of:
    forming a device comprising:
      an optical fiber having a core and a cladding;
      a grating formed in the core of the optical fiber, said grating comprising equally spaced perturbations in the refractive index of the core, each of said perturbations being equal to the other perturbations in magnitude; and
      a piezoelectric element attached to the optical fiber adjacent to the grating, said piezoelectric element being thicker at a first portion than at a second portion of the piezoelectric element which is adjacent to a different axial location on the optical fiber than the first portion; and
    applying an electric field to said piezoelectric element in a direction perpendicular to the axis of the optical fiber, for deforming the piezoelectric element in a direction parallel to the axis of the optical fiber.

* * * * *